Oct. 4, 1966   K. STEISSLINGER ETAL   3,276,714
MULTIPLE-PART DETACHABLE FILM CARTRIDGE OR FILM PACK
Filed Oct. 2, 1964   3 Sheets-Sheet 1

HORST SIMON
KURT STEISSLINGER
INVENTORS

BY
ATTORNEYS

Oct. 4, 1966  K. STEISSLINGER ETAL  3,276,714
MULTIPLE-PART DETACHABLE FILM CARTRIDGE OR FILM PACK
Filed Oct. 2, 1964  3 Sheets-Sheet 2

HORST SIMON
KURT STEISSLINGER
INVENTORS

BY R. Frank Smith
Malcolm J. Dunn
ATTORNEYS

Oct. 4, 1966 K. STEISSLINGER ETAL 3,276,714
MULTIPLE-PART DETACHABLE FILM CARTRIDGE OR FILM PACK
Filed Oct. 2, 1964 3 Sheets-Sheet 3

HORST SIMON
KURT STEISSLINGER
INVENTORS

BY R. Frank Smith
Malcolm F. Dunn
ATTORNEYS

United States Patent Office 3,276,714
Patented Oct. 4, 1966

3,276,714
MULTIPLE-PART DETACHABLE FILM
CARTRIDGE OR FILM PACK
Kurt Steisslinger and Horst Simon, Stuttgart-Hedelfingen,
Germany, assignors to Eastman Kodak Company, Rochester, N.Y., a corporation of New Jersey
Filed Oct. 2, 1964, Ser. No. 401,033
Claims priority, application Germany, Oct. 5, 1963,
K 51,008
5 Claims. (Cl. 242—71.2)

The invention relates to a two-part detachable film cartridge or film pack in which the unexposed film is disposed with or without spool in one chamber, the leading edge of the film or a paper backing connected therewith projecting into the other chamber designed to receive the exposed film, where it is connected to a take-up spool or wound up without spool.

Two-part detachable roll film cartridges or packs containing a supply and a take-up core with threaded film that is ready for use, each spool being seated in one pack chamber, are known. The two cartridge or pack chambers are detachably connected. The cartridge chambers, are however, designed so that they cannot be detached in bright light and inserted into the camera without risking a fogging of the light-sensitive material unless films are used having a light-tight backing paper or a suffiiciently large leader and trailer.

Furthermore it is known to load the camera with film magazines preferably having no spools, the unexposed film being drawn from one chamber by transport means disposed at the camera and after exposure fed to the other chamber. The chamber containing the exposed film is removed from the camera for the purpose of processing and is replaced by the empty chamber.

If one container is damaged, especially in the area of the slot through which the film leaves the chamber or through which it is fed, it is difficult to thread the film into the exposed film receiving chamber. Another shortcoming of these cartridges must be seen in the fact that owing to the friction caused during winding up of the film the emulsion side of the film might be damaged.

It is the object of the invention to facilitate loading of the camera with film avoiding the shortcomings of the known devices. According to the invention this task is solved by the two-part detachable film cartridge or film pack, where the unexposed film is disposed with or without spool in one chamber, the leading edge of the film or a paper backing connected therewith projecting into the other chamber designed for receiving the exposed film and being connected therein to a take-up spool or wound up without spool, in that each of the detachably connected cartridge chambers, which, if combined, form a unit, has the shape and function of a light-tight container. After separation of the film cartridge or film pack which is effected manually or by means disposed at the camera it is pulled apart and placed into the compartments provided in the camera. Owing to the useful connection of the leading edge of the film to a paper backing the film can be inserted in the camera without loss of film. Additionally, rewinding becomes unnecessary if the film cartridges or film packs according to the invention are used.

Further details of the invention may be taken from the description of some embodiments as well as from the claims.

In the drawings which form a part of the disclosure of this invention:

FIG. 1 is a perspective view of the film cartridge or film pack as a unit before its separation;

FIG. 2 discloses the film cartridge or film pack, according to FIG. 1, separated for being inserted into the camera;

Figure 5:
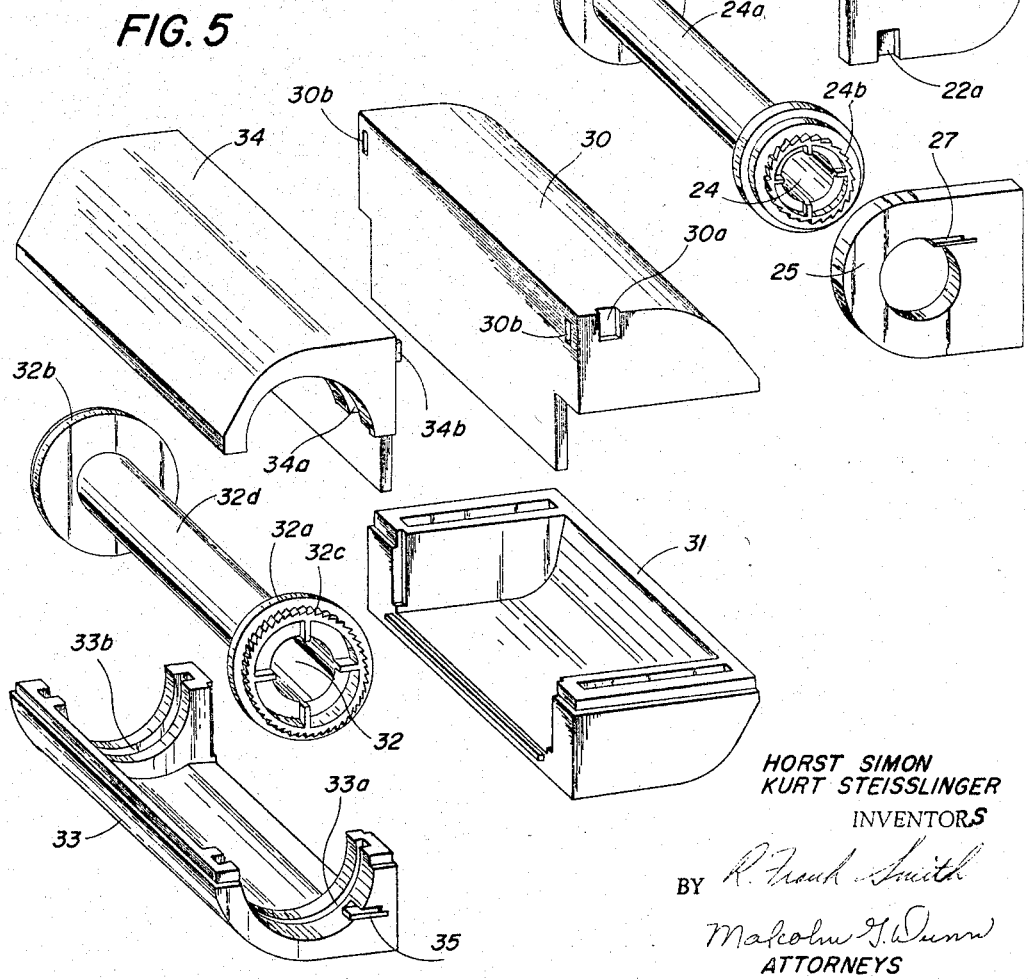
FIG. 5 is a perspective view of the components of a further embodiment of the film cartridge or film pack whose chambers have the shape of shells.
Figure 6:
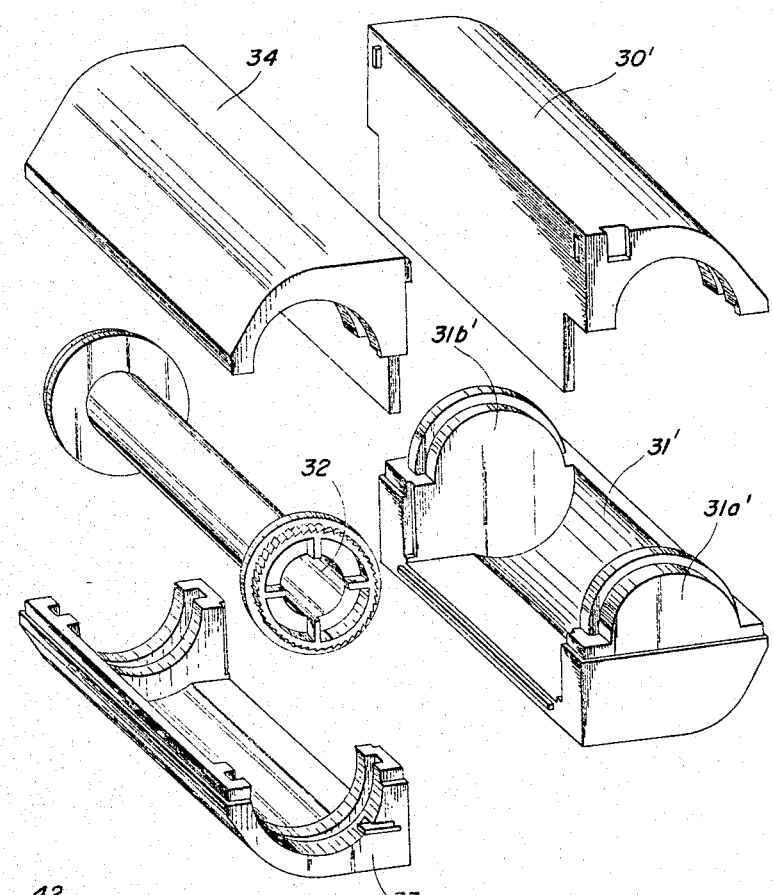
Figure 7:
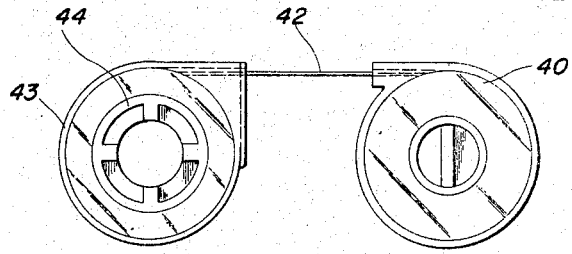
Figure 8:
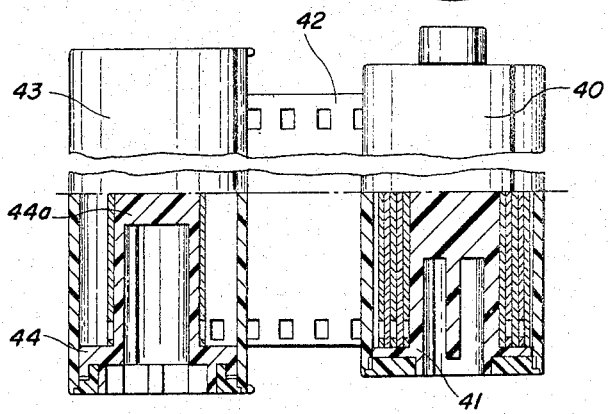

FIG. 6 discloses the components of an embodiment of the film cartridge or film pack, slightly deviating from the construction according to FIG. 5 having the shape of shells;

FIG. 7 is a plan, exploded view of a film cartridge or film pack employing a commercial film supply chamber; and FIG. 8 is a view of the film cartridge or film pack according to FIG. 7.

Figure 1:
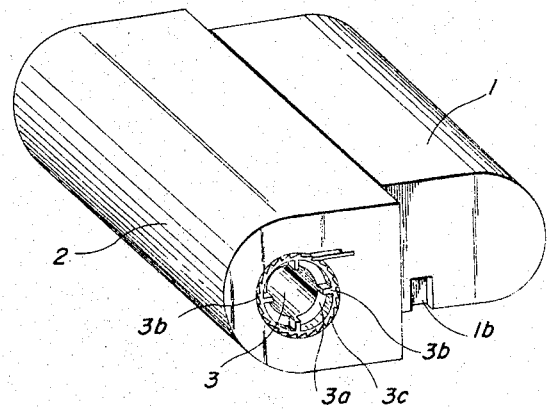
Figure 2:
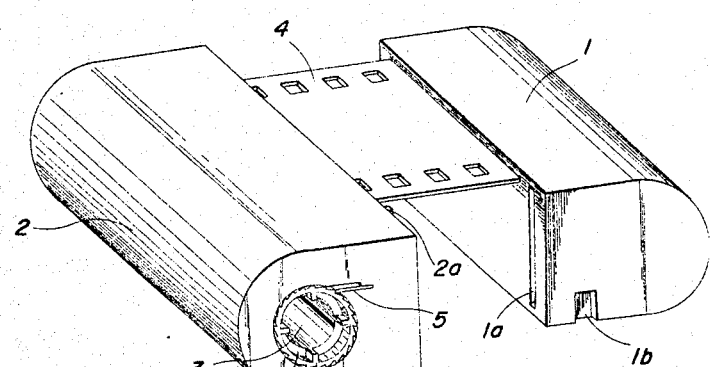

In the embodiment of the film cartridge according to FIGS. 1 and 2 part 1 houses the unexposed film supply preferably without spool, whereas part 2 serves for receiving the exposed film. Part 2 is disclosed as being larger in size than part 1 so that they will load in a camera having compartments of corresponding size in only one manner. Part 2 is provided with a spool 3 to whose core the leading edge of film 4 or a paper backing pertaining to this film is fastened. Flange 3a of spool 3 is provided with engaging levers 3b and a toothing 3c. The toothing 3c, which constitutes ratchet means, is engaged by locking or pawl means 5, preferably having the form of a flat spring, resilient detent or the like allowing a turning of spool 3 in wind-up direction only. One or several ribs 2a, if connected, engage with one or several slots 1a and serve as fastening and/or connection means for parts 1 and 2. The dimension and/or position of a recess 1b disposed at part 1 is adapted to the sensitivity or some other characteristic of the film material contained within the film pack. The recess 1b is scanned by exposure control and/or setting members disposed at the camera for the purpose of considering the film sensitivity. It is within the scope of the invention to provide also part 2 with a mark (not shown) corresponding to the sensitivity and/or kind of material contained in the cartridge. This mark could serve for considering the film sensitivity by means of exposure control and/or setting members disposed at the camera and/or allow an automatic sorting of the cartridges in the developing and printing station.

Figure 3:
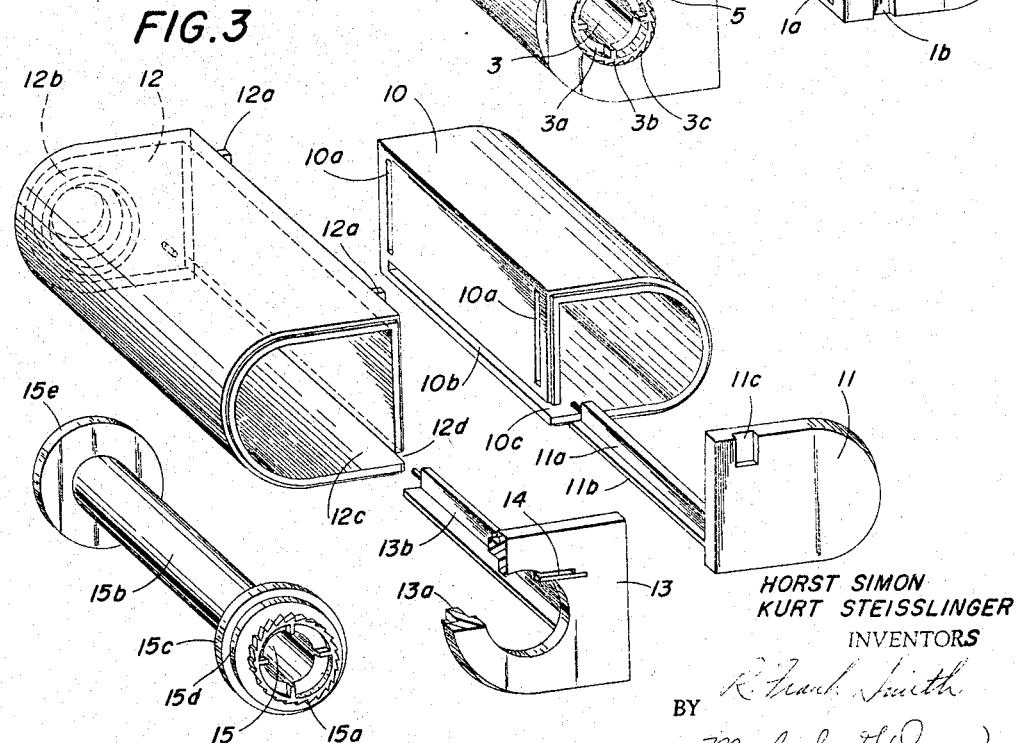
FIG. 3 is a perspective view of the components of another embodiment of the film cartridge or film pack.

The components of the film cartridge or film pack according to FIG. 3 essentially form a cartridge corresponding to FIGS. 1 and 2 if joined together. Part 10 for receiving the unexposed film is provided with slots 10a. Together with ribs 12a these slots 10a serve for fastening parts 10 and 12 to one another and/or connecting them. Lid 11 with which part 10 is closed after insertion of the film is provided with an angular or L-shaped extension 11a, 11b. That side 11b of the extension which faces the film guide as well as surface 10b in the area of the slot 10c is designed so as to afford protection against light for instance by special shaping; otherwise they are provided with means having such an effect. The L-shaped extension slidingly interfits within the slot to form one side of a passageway for the film, thereby serving as light protection and securement of lid 11 to part 10. The position and/or shape of recess 11c disposed at or in lid 11 is adapted to the sensitivity of the inserted film material. Flat spring 14 is attached to lid 13 which closes part 12 for receiving the exposed film. Said spring serves as a locking or pawl means and, with its front end, engages with the toothing or ratchet means 15a of spool 15. This prevents an uncoiling or clockspringing in the unwind direction of the film fastened to core 15b and wound thereon. Spool 15 is guided in part 12 in a light-tight manner with its raised portion 15d at flange 15c fitting into the annular raised portion 13a at lid 13 and with the raised portion at flange 15e (not shown) fitting into the raised portion 12b of part 12. In the area of slot 12d extension 13b as well as surface 12c is provided with means preventing light from entering into part 12 of the cartridge.

Figure 4:
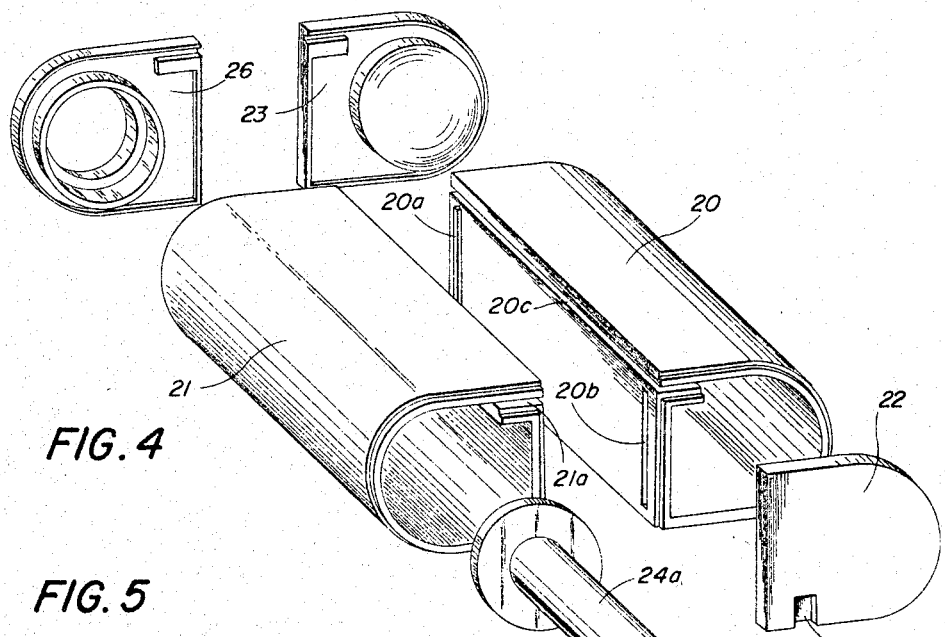
FIG. 4 is a perspective view of the components of still another embodiment of the film cartridge or film pack whose chambers are alike.

In the film cartridge according to FIG. 4 part 20 representing the unexposed film receiving chamber corresponds to part 21 serving as a container for receiving the exposed film. Part 20 is provided with a rib 20a and a recess or slot 20b. Opposite rib 20a there is a recess or slot which is not shown in the drawing and which corresponds to recess 20b, whereas opposite recess 20b there is a rib corresponding to rib 20a. Slots 20c and 21a serve for guiding the film and are so formed as to exclude the light. The film which is not shown in the drawing is preferably inserted without spool into part 20 which is closed by way of lids 22 and 23.

The leading edge of the film or backing paper pertaining to it is fastened to core 24a of spool 24. Spool 24 is light-tightly and rotatably seated between lids 25 and 26. Lids 25 and 26 close the front sides of part 21. Lid 25 is provided with a locking or pawl means 27 having the form of a flat spring preventing an uncoiling or clockspringing in the unwind direction of the film together with toothing or ratchet means 24b. The shape and position of the recess disposed at lid 22 corresponds to the sensitivity of the film material inserted.

The parts of the film cartridge according to FIG. 5 have the shape of shells. When combined, parts 30 and 31 are forming the container which receives the unexposed material. The shape and/or position of recess 30a corresponds to the sensitivity of the material inserted. Spool 32 is enclosed by parts 33 and 34 and is guided in a light-tight manner. For this purpose flanges 32a and 32b engage with the grooves 33a and 33b as well as 34a and with another groove that is not shown. Part 33 is provided with a locking or pawl means which, together with toothing or ratchet means 32c, prevents an uncoiling or clockspringing in the unwind direction of the exposed film wound to the core 32d of spool 32. In connection with projections 34b slots 30b serve for fastening and/or connecting the two cartridge chambers 30, 31 and 33, 34.

As regards the cartridge chambers according to FIG. 6 whose design resembles the parts of the embodiment described in FIG. 5 to a large degree therefore being termed alike, simply parts 30' and 31' are shaped differently. The ends 31a' and 31b' of part 31' are disk-shaped and, in conjunction with part 30', close the container for receiving light-sensitive material.

The embodiment of the cartridge chambers corresponding to FIGS. 7 and 8 differs from those described so far in that the film supply chamber is a commercial cartridge with spool. Chamber 40 on whose spool 41 the film 42 is wound forms a unit together with chamber 43. Chamber 43 is disclosed as being larger in size than chamber 40 so that such chambers will load in a camera having compartments of corresponding size in only one manner. As in other embodiments the leading edge of the film or paper backing is connected with core 44a of spool 44. Before having reached operating position, which approximately corresponds to the position shown in the drawings, the two cartridge chambers 40 and 43 are connected by means of adhesive tape, clips or the like to form a relatively small transport or supply unit.

The advantage of the invention as regards the usual handling of film cartridges is seen in the fact that the troublesome threading of the film when the camera is loaded and the rewinding of the exposed film is no longer necessary. Before use (storage, transport) the cartridge is small in bulk and is pulled apart to the required length before insertion into the camera. Simply the cartridge chamber containing the exposed film is sent to the developing and printing station.

The invention has been described in detail with particular reference to preferred embodiments thereof, but it will be understood that variations and modifications can be effected within the spirit and scope of the invention as described hereinabove and as defined in the appended claims.

I claim:

1. A film pack adapted to be loaded in a camera, said pack comprising:
   a first part constituting a film supply chamber, and a second part constituting a film take-up chamber;
   each of said parts having a slot extending axially of the part and serving as a passageway for film;
   each of said chambers being opened at one end and closed at the other end and having a lid for light-tightly closing the open end, said lid being provided with an L-shaped extension which slidingly interfits within the slot to form one side of said passageway for purposes of light protection and securement of the lid to said open end;
   means for detachably connecting together said first and second parts as a pack, with said slots being in face to face relation;
   and a roll of film means disposed within said supply chamber and having a leading end extending from the supply chamber through each of said slots for attachment within said take-up chamber;
   said parts adapted to be separated and pulled a predetermined distance apart for loading in the compartments of a camera.

2. A film pack as defined in claim 1 wherein one of said lids is provided with a recess indicative of a particular characteristic of the film contained within said film pack.

3. A film pack adapted to be loaded in a camera, said pack comprising:
   a first part constituting a film supply chamber, and a second part constituting a film take-up chamber;
   each of said parts having a slot extending axially of the part and serving as a passageway for film;
   a roll of film means disposed within said supply chamber and having a leading end extending from the supply chamber through each of said slots for attachment within said take-up chamber;
   a film spool disposed within the film take-up chamber to which said film means leading end is attached and having at least one flange;
   said take-up chamber having means closing the ends thereof in a light-tight manner while providing an opening at one end through which said spool flange is exposed;
   cooperating pawl means and ratchet means disposed between said exposed spool flange and said end closing means and located on the outside of said film take-up chamber for releasably preventing clockspringing of film within the take-up chamber in the unwind direction;
   and means for detachably connecting together said first and second parts as a pack, with said slots being in face-to-face relation;
   said parts adapted to be separated and pulled a predetermined distance apart for loading in the compartments of a camera.

4. A film pack as defined in claim 3 wherein said pawl means is disposed on the outside surface of said end closing means and said ratchet means comprises toothing formed in the periphery of said exposed spool flange.

5. A film pack for a camera, comprising:
   two distinct containers, one constituting a supply chamber for receiving a supply roll of film and the other constituting a take-up chamber for the exposed film;
   one of said containers being different in size from the other said container so that said containers of the film pack will load in the compartments of a camera in only one manner;

each of said containers having an axially extending film slot and a surface adjacent the slot, said slots being positioned to form a continuous passageway connecting the interiors of the two chambers when the chambers are brought together with film from the supply chamber passing into the take-up chamber and with said surfaces in face-to-face relation;

and means for releasably holding said chambers in such face-to-face relation until ready for loading into a camera, whereupon the chambers are moved apart to their respective camera loading positions.

References Cited by the Examiner
UNITED STATES PATENTS

| | | | |
|---|---|---|---|
| 1,440,173 | 12/1922 | Ponting et al. | 242—71.2 |
| 1,947,482 | 2/1934 | Mihalyi | 242—71.2 X |

FRANK J. COHEN, *Primary Examiner.*

MERVIN STEIN, *Examiner.*

N. L. MINTZ, *Assistant Examiner.*